United States Patent
Tassinario et al.

(10) Patent No.: US 8,919,685 B2
(45) Date of Patent: Dec. 30, 2014

(54) METHOD FOR MANUFACTURING A CYLINDRICAL WINDING FOR SLOTLESS ELECTRICAL MACHINE

(75) Inventors: Giampiero Tassinario, Florence (IT); Ivan Flotats, Barcelona (ES); Francesc Cruellas, Tiana (ES); Joaquim Galceran, Granollers (ES)

(73) Assignee: Infranor Holding S.A., Yverdon-les-Bains (CH)

( * ) Notice: Subject to any disclaimer, the term of this patent is extended or adjusted under 35 U.S.C. 154(b) by 516 days.

(21) Appl. No.: 13/329,843

(22) Filed: Dec. 19, 2011

(65) Prior Publication Data
US 2012/0175991 A1 Jul. 12, 2012

(30) Foreign Application Priority Data
Dec. 23, 2010 (EP) .................................... 10196906

(51) Int. Cl.
H02K 15/09 (2006.01)
H02K 15/04 (2006.01)
H02K 15/08 (2006.01)
H02K 3/47 (2006.01)

(52) U.S. Cl.
CPC ............ *H02K 15/0442* (2013.01); *H02K 15/08* (2013.01); *H02K 3/47* (2013.01)
USPC .................. 242/433.1; 242/433.4; 242/434.4; 242/434.9

(58) Field of Classification Search
USPC ................ 242/431, 433.1, 433.4, 434, 434.4, 242/434.9
See application file for complete search history.

(56) References Cited

U.S. PATENT DOCUMENTS

| 4,568,862 A | 2/1986 | Tassinario |
| 4,629,948 A | 12/1986 | Tassinario |
| 4,837,921 A | 6/1989 | Tassinario |
| 5,998,905 A | 12/1999 | Fougere et al. |
| 6,991,194 B2 * | 1/2006 | Stratico et al. ............. 242/432.5 |
| 2010/0181860 A1 | 7/2010 | Pulnikov |

FOREIGN PATENT DOCUMENTS

| EP | 0 123 347 A | 10/1984 |
| EP | 0 159 069 A | 10/1985 |
| EP | 0 313 514 A | 4/1989 |
| ES | 8502817 A | 4/1985 |

OTHER PUBLICATIONS

Search Report issued by European Patent Office for priority application EP 10196906, dated Jun. 15, 2011.

* cited by examiner

*Primary Examiner* — Emmanuel M Marcelo
(74) *Attorney, Agent, or Firm* — Frommer Lawrence & Haug LLP; Ronald R. Santucci

(57) ABSTRACT

A method for manufacturing a cylindrical winding for slotless electrical machine according to the following steps:

a) a winding head (211) able to move according to three axes X, Y, Z, winds continuously a wire following a predetermined winding program around two sets of needles (80) on the external surface of a first cylindrical tube (6). The needles are located on the conical shaped end surfaces of two identical cylindrical bodies axially juxtaposed and axially and rotatable movable (R). The cylindrical bodies are partially located inside the first cylindrical tube (6), b) after the achievement of the winding operation of all the electrical machine phases all around the 360° peripheral surface of the first cylindrical tube (6) a second cylindrical tube is put around the achieved winding (41);

c) the two sets of needles (80) are taken away and the two cylindrical bodies are axially moved away.

14 Claims, 3 Drawing Sheets

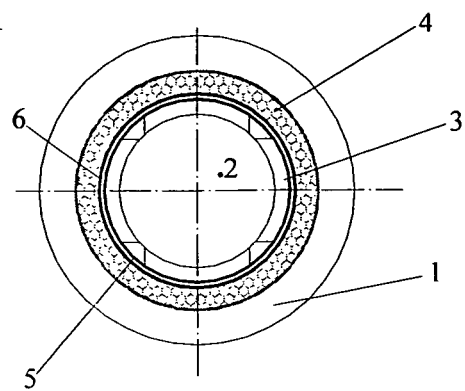
Fig.1
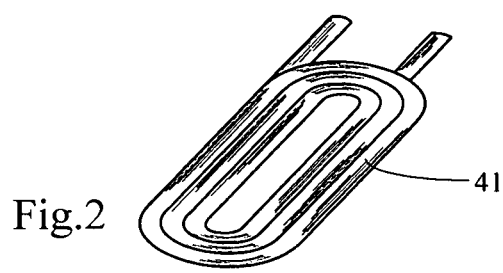
Fig.2
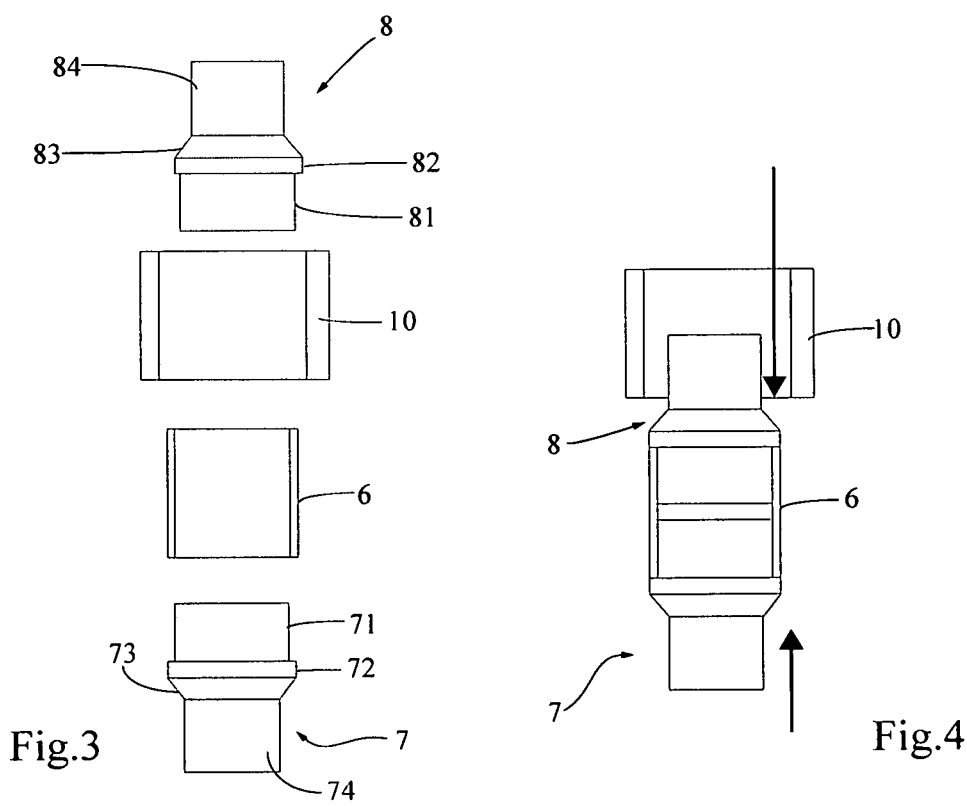
Fig.3
Fig.4

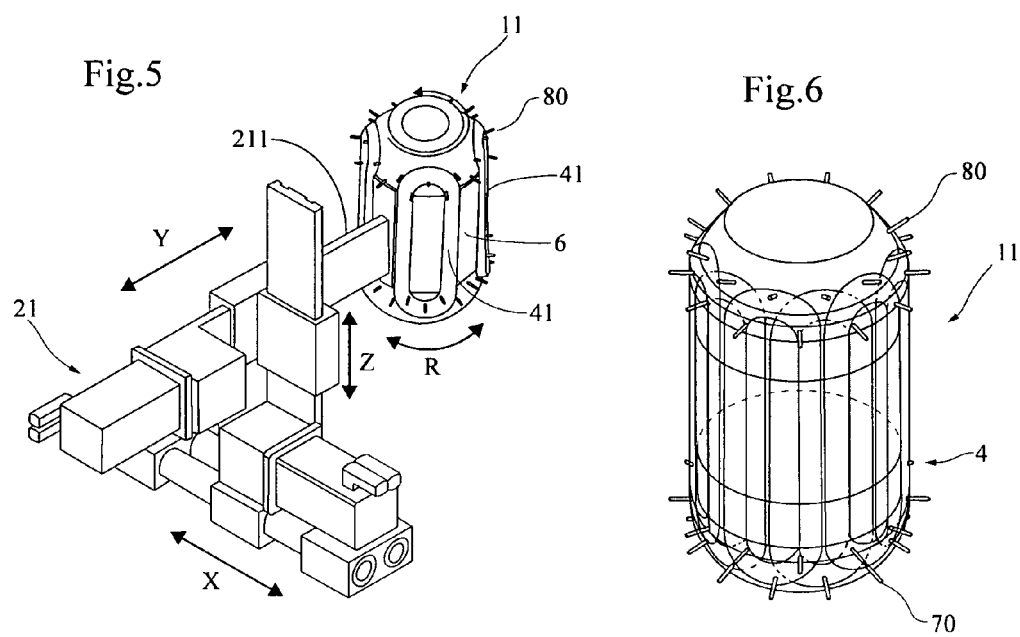
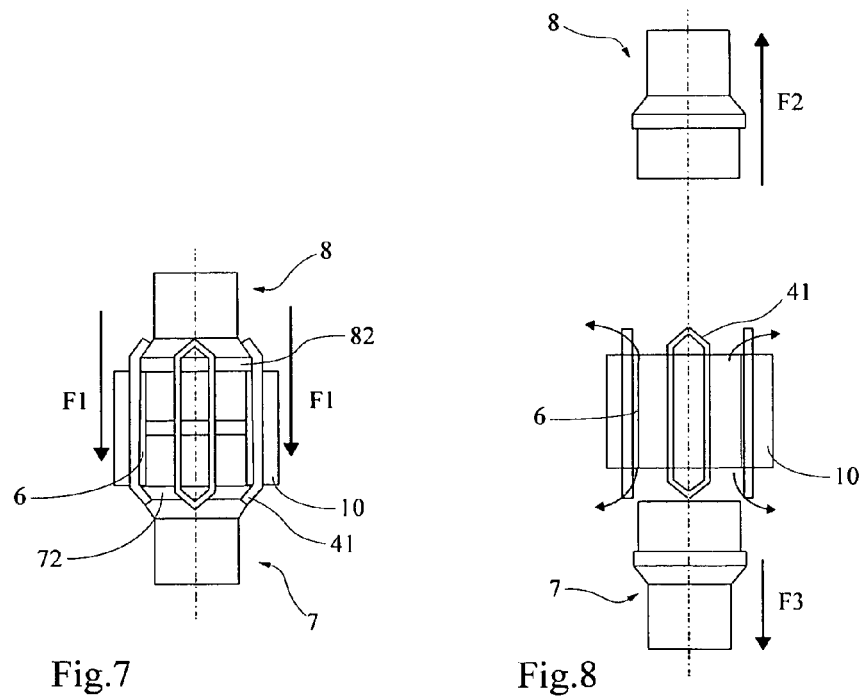

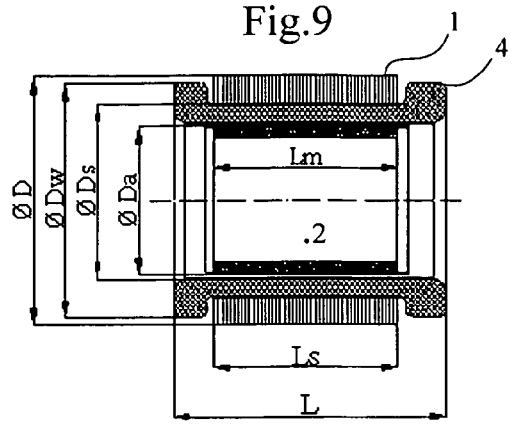
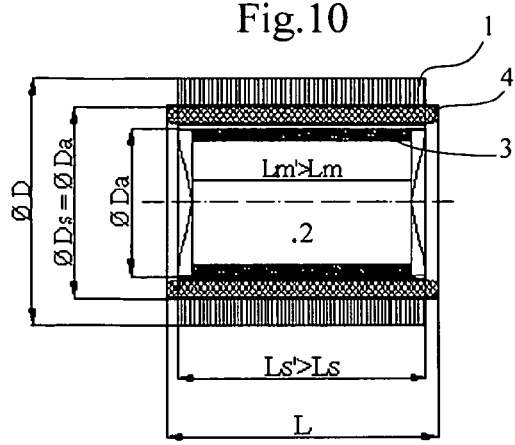
Fig.9  Fig.10
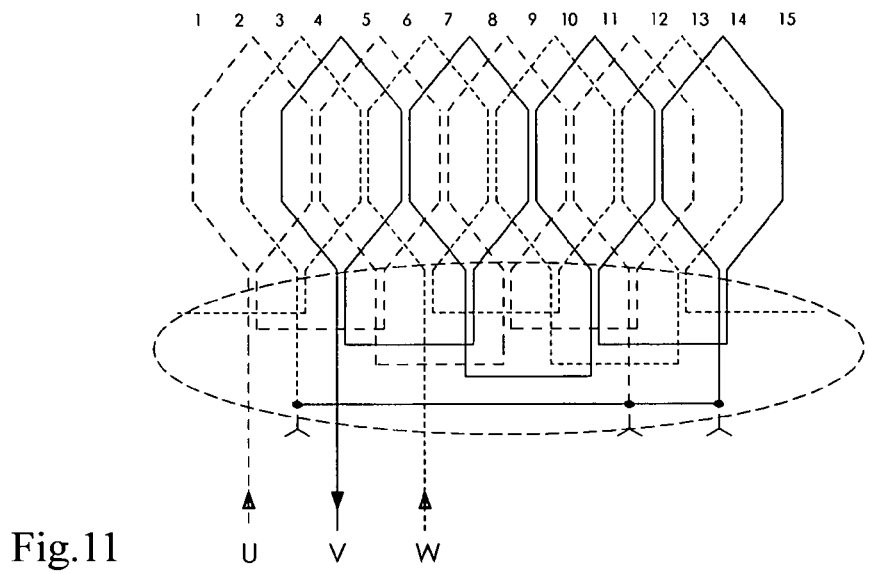
Fig.11
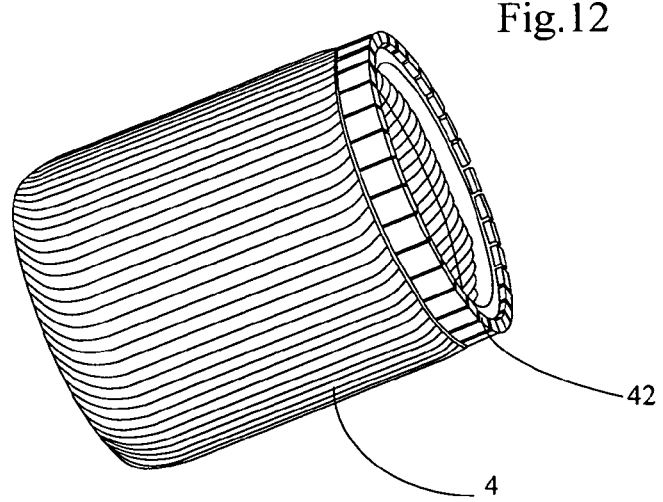
Fig.12

METHOD FOR MANUFACTURING A CYLINDRICAL WINDING FOR SLOTLESS ELECTRICAL MACHINE

This application claims priority benefits to European Patent Application Number 10196906.1 filed Dec. 23, 2010, the entire disclosure of which is incorporated herein by reference.

FIELD OF THE INVENTION

The present invention relates to a method for manufacturing a cylindrical winding for slotless electrical machine and an installation allowing to carry out this method and a winding made according said method.

The main objective of the present invention is a method for manufacturing an electrical machine cylindrical winding automatically. The kind of winding, is not placed in any slot of any stack of electrical steel as it is widely standardized. Wires of the coils are together placed, one next to each other, so that there is no modulation of the magnetic flux due to the presence of any tooth. The technology used is known as a slotless winding.

BACKGROUND OF THE INVENTION

The fact that in standard windings, the coils are placed into the slots of the laminated stacks makes this method not enough flexible for choosing any type of wire diameter, as the slots have a specific section, and the entrance to them is limited by the type of punch being used. It is widely commented in patent ES 531635 and although in that patent a winding system is also produced without iron, the differential issue from this, is the fact, that the wires are being placed fulfilling all the surrounding space of the electrical machine rotor.

One of the difficulties of manufacturing electrical machines with windings without slots is that this technology is not often being used as it is not easy to hold wires without any tooth to keep them.

SUMMARY OF THE INVENTION

Our invention proposes a system where it is possible to create this sort of windings with the advantage of using a technology that allows electrical machines to make high performance movements. This sort of electrical machines has a minimum ripple torque as there is no flux modulation due to the absence of the teeth that modulates it, there is no cogging torque, so positioning these electrical machine rotors is more easy in any angular position, provides higher torque as the rotor diameter can be bigger because the winding is placed in a crown placed outer. Eddy currents in the magnets are avoided so higher level of speeds can be reached, lower level of iron saturation exists in the lamination steel, so losses are lower more powerful and therefore the efficiency is higher. Some patents like EP 0159069B1 or EP 0123347 comments also some of the great advantages of this sort of technology.

It is also explained a process to produce slotless winding technology in patent EP 0313514B1 although in this system is not so easy to manufacture windings in big quantities as according to the present invention method.

The method according to the present invention is characterized by a) a winding head able to move according to three axes X, Y, Z, winds continuously a wire following a predetermined winding program around two sets of needles and on the external surface of a first cylindrical tube, two identical cylindrical bodies axially juxtaposed and axially and rotatably movable, are partially located inside said cylindrical tube and their remote ends being conical shaped surfaces said needles being located on the conical shaped end surfaces of said two identical cylindrical bodies b) after the achievement of the winding operation of all the electrical machine phases all around the 360° peripheral surface of said first cylindrical tube a second cylindrical tube is put around the achieved winding;

c) said two sets of needles are taken away and the two cylindrical bodies are axially moved away.

According to some embodiments the winding may be the winding of stator or of a rotor with injection of a molding material or not.

The invention relates also to an installation allowing to carry out the method and a winding made according to the present invention method.

Preferred embodiments of the present invention will be described with reference to the attached figures.

BRIEF DESCRIPTION OF THE DRAWINGS

FIG. 1 is side view of an electrical machine provided with a winding manufactured according to the present invention method;

FIG. 2 is a perspective view of coil with concentrically disposed turns;

FIG. 3 is a side view of the main elements of the winding supporting device;

FIG. 4 is a side view of the elements of FIG. 3 in working position;

FIG. 5 is a schematically representation of the installation allowing to carry out the method of the present invention;

FIG. 6 is a perspective view of the winding supporting device;

FIGS. 7 and 8 illustrate schematically the last steps of the method;

FIGS. 9 and 10 show an axially cross section of an electrical machine provided with winding made according to the present method;

FIG. 11 is a usual representation of a winding diagram made according to the present invention;

FIG. 12 is a perspective view of molded winding for a rotor.

In FIG. 1 we have a slotless stator 1, a winding regularly disposed all around the 360° peripheral surface of a thin cylinder 6 made in a non magnetic material such as a fiber glass material, permanent magnets 3 disposed on the peripheral surface of a rotor 2. In the present case a second thin cylinder 5 made in carbon or glass fiber material is disposed around the permanent magnets 3 to hold them radially.

DETAILED DESCRIPTION OF THE INVENTION

Before describing the method for manufacturing the winding we will refer to the main elements of an installation represented in FIG. 5. The main devices of this installation are a winding supporting device 11 provided with means allowing to rotate the device 11 around an axes parallel to the turns of coils 41 of the winding and a device 21 designed to drive a winding head 211 according three axis X, Y, Z. the winding head driving device is schematically represented but any other device allowing the winding head to move according to the three axis may be used. Electronic means (not represented) designed to control the winding head 211 and the winding supporting device 11 according to a predetermined program are also necessary. Said program drives device 11 and 21 according to the kind of winding coils (overlapping coils, concentric coils, imbricated, undulated etc) the number of phases and poles of the electrical machine.

The device 11 is mounted on a rotatable device allowing to drive the device 11 according to arrow R. The main elements of the device 11 are (FIGS. 3, 4) two identical cylindrical bodies 7, 8 axially movable, a first cylindrical tube 6 and a second cylindrical tube 10. Each cylindrical body comprises a cylindrical part 71, 81, ending at a shoulder 72, 82, followed by a conical shaped portion 73, 83. The conical shaped portion may be followed by another cylindrical shaped portion 74, 84 or an element allowing to attach the cylindrical body 7, 8 and to drive it axially. The conical portion 74, 84 is provided with a set of holes designed to receive needles 80 (FIG. 5, 6) around of which the ends of the return loops of the coils 41 are formed. The disposition of the needles in the holes depends on the kind of winding coils.

The first cylindrical tube 6 is designed to be in abutment against the shoulders 72, 82 (FIG. 7) when the cylindrical bodies 7, 8 are close to each other. The second cylindrical tube 10 (FIG. 3, 4) is designed to surround the winding at the end of the winding step.

The cylindrical tubes 6, 10 function and material depend on the kind of winding to be made. For manufacturing the winding as there are no slots, we need a support to hold the wires during the winding operation. The first cylindrical tube 6 is that support.

If the winding to prepare is for a slotless stator without injection of a molding material, the cylindrical tube 6 is a fiber glass cylinder with the minimum thickness, values from 0.3 mm to 0.7 mm are usual. The minimum value is always desired so it is not necessary to provide more quantity of magnet to cross the winding. However it cannot be a fixed value as it will also depend on the diameter of the tube to have enough rigidity and the thickness of the wires used in the winding and the fulfilling factor. As the first cylindrical tube 6 will remain inside the electrical machine, it is important to prevent overstresses that may be occurred during the working of the electrical machine i.e. heat produced by the winding. Obviously, the first cylindrical tube 6 supporting the winding must be of a no magnetic material to avoid any influence in the magnetic circuit. The second cylindrical tube 10 is the slotless stator made by magnetic steel laminations or magnetic powder If the winding to prepare is for a slotless stator or rotor with injection of a molding material to rigidify the winding, the first and second cylindrical tubes 6, 9 are two matching parts of a mold. At the end of the winding operation on the first cylindrical tube 6, the second cylindrical tube 10 is put around the winding and a molding material is injected. After cooling, the mold is removed producing a rigid cylindrical winding.

If the winding to prepare is for a slotless rotor without injection of a molding material, both cylindrical tubes 6, 10 are thin no magnetic material tubes supporting the rotor winding. In this case the varnish of the winding will make a similar action as a bonding material to avoid any movement of the tubes due to centrifugal efforts Both cylindrical tubes 6, 10 will remain inside the electrical machine. For rotor windings, molded with a molding material or not, a commutation ring is added at the end of the method. For the molded rotor winding the commutation ring is connected to the winding before the molding operation.

The molding material must be chosen to support high temperatures of the wires cooper without deformation of the coils.

We will describe now the method with reference to FIGS. 3 to 8 relating to the winding of a slotless stator. The description and FIGS. 5, 6 relates to the manufacturing of a winding whose turns of the coils are placed concentrically (see FIG. 2). Any other kind of winding may be manufactured according to the present invention, the main difference being the needles 80 setting and the control electronic means program controlling the winding head 211 movements and the winding supporting device 11 rotation movements.

At the beginning the first cylindrical tube 6, which is a thin fiber glass tube, is put in the space between the cylindrical bodies 7, 8. The cylindrical bodies 7, 8 are moved until their shoulders 72, 82 are in abutment against the ends of first cylindrical tube 6 (FIG. 4). The needles 80 are placed on the conical portions 73 83. The winding head starts the winding operation and forms continuously (in series) the coils 41 of a first electrical phase, as seen in FIG. 11 and after the second electrical phase etc. Depending on the type of winding, i.e. WYE (star) connected or triangle, the coils can be in series or in parallel, and connections between coils will vary. The program will control it to reduce them so for example if it is triangle connected the coils can be in series and the wire is not cut until the end of the winding operation (see FIG. 11) so the number of connections of the coils are reduced to a minimum, only the output cable will have to be soldered.

In the described example we place the wires of the coils concentrically so the space used is optimized, as no crosses of the wires may appear that could create problems of thickness or damaging the wires. In FIG. 2 it is shown how the wires of the coils are placed. This forces the winding head 211 to be sensitive enough for placing the wires correctly in three dimensions as deepness is also relevant. For this reason the device 21 is able to work according to three axes X, Y and Z (FIG. 5) to place the wire correctly and to monitor the winding supporting device 11 where the coils 41 are being placed. The installation is able to wind all kind of windings, overlapped, concentrated, multiphase and even imbricated or undulated brushed type.

After completion of the winding operation the second cylindrical tube 10, which is the slotless stator is put around the formed winding (FIG. 7). The needles 80 are removed followed by both cylindrical bodies 7, 8 according to the arrows F2, F3 (FIG. 8). When removing cylindrical tubes 7, 8 without the needles, the conical parts of the coils are pushed radially according the four arrows shown on FIG. 8. The ends of the coils 41 after removal of the cylindrical bodies 7, 8 will elastically return toward their initial position that is bent toward the geometrical axis of the first cylindrical tube 6. So the first cylindrical tube 6 is hold and the same time we avoid the winding falls down from the second cylindrical tube 10. The fiber glass tube 6 will remain inside the electrical machine. Everything is hold by pressure.

Concentric turns in the winding allow to avoid the formation of embossed ends as they are not crosses of the return loops. So the thickness of the winding is the same throughout. The present invention allows manufacturing windings with embossed ends as shown in FIG. 9 or of same thickness throughout as shown in FIG. 10. In the second case the stator is longer and the performances of the machine are improved. It is also possible to manufacture constant thickness windings throughout even the turns of the coils are not concentric as explained in the pending European Patent Application EP 10195053.3 of the same Applicant.

Windings where the coils are injected one to one and further making the appropriate connections cannot be compared with the present invention.

The method for manufacturing a molded winding is as previously explained with the following differences: The first and second cylindrical tubes 6, 10, are the matching parts of a mold. After completion of the winding, the second cylindrical tube 10 is put around the winding and forms with the first cylindrical tube 6 a mold in which a molding material is injected. After cooling the mold the two cylindrical tubes are removed and we have a molded winding. If the molded winding is that of a rotor before injecting the molding material a connection ring has to be added and connected to the relevant coils (see FIG. 12).

If the winding is a no molded winding for a rotor the first cylindrical tube 6 is thin fiber glass tube to support the winding and at the end of the winding the second cylindrical tube 10 also in fiber glass is put around the winding. Both tubes support the winding and they remain around the rotor. A connection ring has also to added and connected to the relevant coils.

The invention claimed is:

1. Method for manufacturing a cylindrical winding, comprising several turns of a wire and return loops, for slotless electrical machine according to the following steps:
   a) a winding head able to move according to three axes X, Y, Z, winds continuously a wire following a predetermined winding program around two sets of needles and on the external surface of a first cylindrical tube, two identical cylindrical bodies axially juxtaposed and axially and rotatably movable, are partially located inside said cylindrical tube and their remote ends being conical shaped surfaces said needles being located on the conical shaped end surfaces of said two identical cylindrical bodies
   b) after the achievement of the winding operation of all the electrical machine phases all around the 360° peripheral surface of said first cylindrical tube a second cylindrical tube is put around the achieved winding;
   c) said two sets of needles are taken away and the two cylindrical bodies are axially moved away.

2. A method according to claim 1, wherein said first and second cylindrical tubes are two matching parts of mold in that after the second cylindrical part is put around the achieved winding so the formed mold is filled with a molding material and in that after cooling the mold is removed producing a rigid cylindrical winding.

3. A method according to claim 2, wherein said winding is a rotor winding, and in that at the end of the method a commutation ring is connected to the winding.

4. Cylindrical winding for electrical machine made according to the method of claim 2.

5. Cylindrical winding for electrical machine made according to the method of claim 3.

6. A method according to claim 1, wherein said winding is a stator winding, said first cylindrical tube supporting the winding is made in a non magnetic material and in that the second cylindrical tube is a slotless stator made in magnetic material.

7. Cylindrical winding for electrical machine made according to the method of claim 6.

8. A method according to claim 6, wherein said no magnetic material is fiber glass and said magnetic material is a stack of steel lamination or in magnetic powder.

9. A method according to claim 1, wherein said winding is a rotor winding, said first and second cylindrical tubes supporting the winding are made in a no magnetic material and in that at the end of the method a commutation ring is connected to the winding.

10. Cylindrical winding for electrical machine made according to the method of claim 9.

11. A method according to claim 1, wherein the turns of the wire forming each coil of the winding are disposed concentrically to avoid crosses of the turns of the wire at return loops of the turns of the wire of the coils and allowing to obtain a winding having the same thickness throughout.

12. Cylindrical winding for electrical machine made according to the method of claim 11.

13. Installation for carrying out the method according to claim 1, wherein it comprises a device provided with a winding head designed to move according three different axes X, Y, Z, a winding supporting device rotatable around an axis parallel to the turns of the wire of the winding comprising two axially juxtaposed cylindrical bodies designed to move axially provided at their remote ends with a shoulder followed by conical shape portions, said conical shaped portions being provided with means designed to hold a set of pins, a first cylindrical tube designed to be in abutment between said shoulders when both cylindrical bodies are close, and a second cylindrical body axially movable and designed to be around the cylindrical winding and control electronic means designed to control the winding head and the winding supporting device rotation movements.

14. Cylindrical winding for electrical machine made according to the method of claim 1.

* * * * *